Nov. 4, 1969   R. V. HALSTENBERG   3,476,129
STABILIZATION-ORIENTATION SYSTEM
Filed Sept. 28, 1965   2 Sheets-Sheet 1

INVENTOR
REYNOLD V. HALSTENBERG
BY
*Sidney Magnes*
AGENT

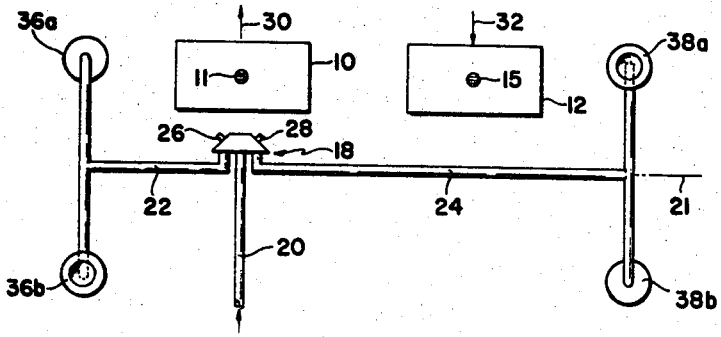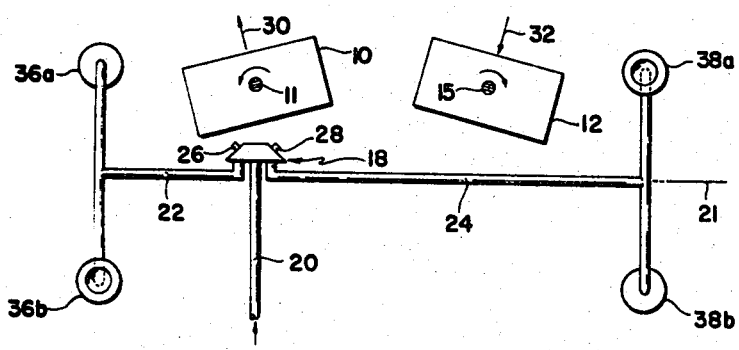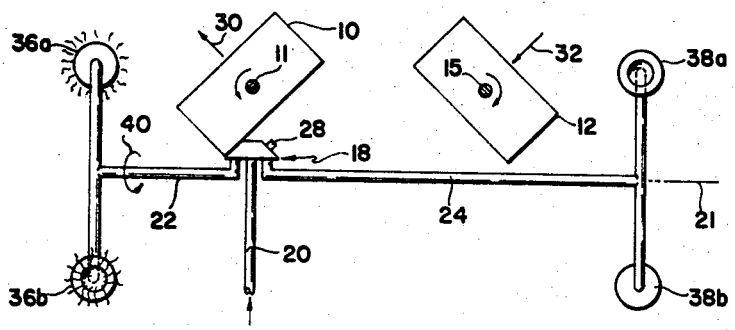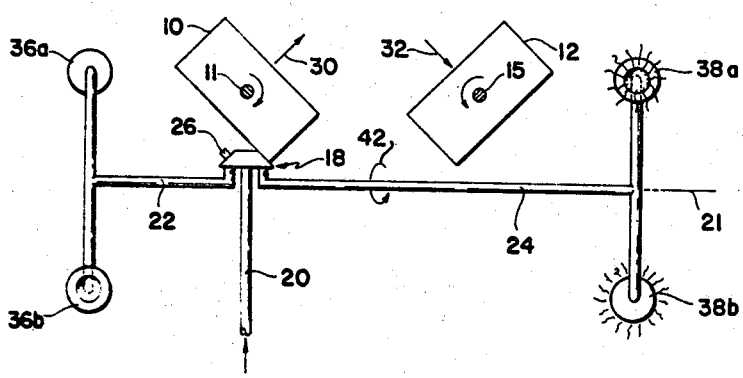
FIG. 2
INVENTOR
REYNOLD V. HALSTENBERG
BY Sidney Magnes
AGENT

United States Patent Office 3,476,129
Patented Nov. 4, 1969

3,476,129
STABILIZATION-ORIENTATION SYSTEM
Reynold V. Halstenberg, Palos Verdes, Calif., assignor to North American Rockwell Corporation, a corporation of Delaware
Filed Sept. 28, 1965, Ser. No. 490,796
Int. Cl. G01c *19/02, 19/06;* B64c *17/06*
U.S. Cl. 137—38                                     15 Claims

ABSTRACT OF THE DISCLOSURE

This invention relates to a system for both stabilizing and orienting a body in space; and more particularly to a simple lightweight arrangement using gyroscopes and reaction jets, and no electronic circuitry. A pair of gyroscopes are coupled together to form an angular-momentum-exchange system; and those forces tending to rotate the body, instead cause the gyroscopes to approach or separate from each other. Thus, rather than having the body rotate, the gyroscopes move in an angular-momentum-exchange manner. In this way, they stabilize the body on which they are mounted.

Figure 1:
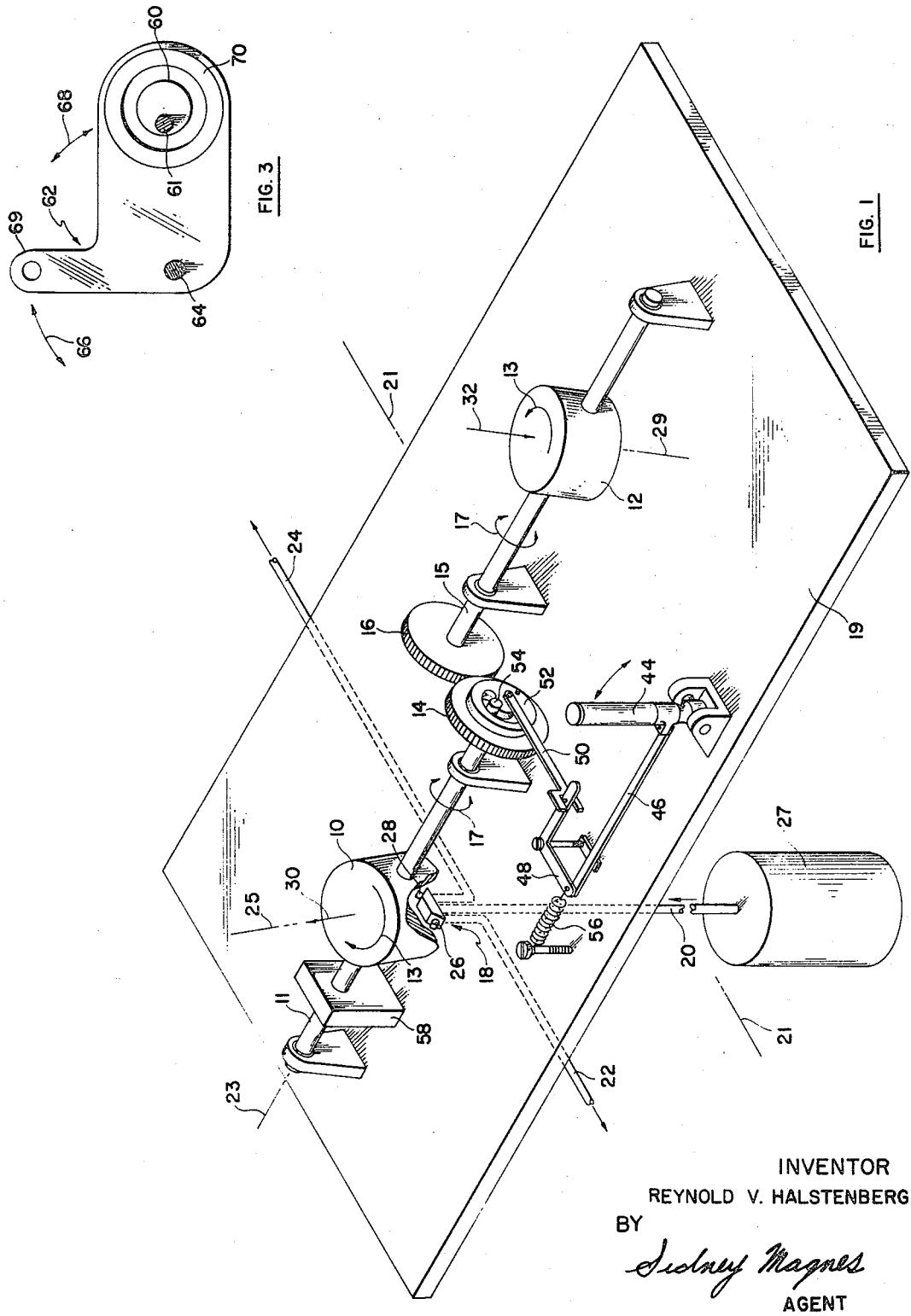

Since the gyroscopes can achieve only a finite amount of stabilization, they tend to become "saturated"; but, before this point, they actuate a triggering arrangement that turns on a "torquer," such as a reaction jet. The torquer is oriented to continue the stabilizing operation; and eventually rotates the body in the opposite direction—thus de-saturating the gyroscopes, de-actuating the torquer, and returning the system to a quiescent state.

BACKGROUND

Present-day excursions into space have directed attention to the dual problems of stabilizing and orienting a body. As is well known, on the earth a moving body is constantly exposed to various frictional and gravitational forces that tend to stop its movement; and experience has conditioned human beings to depend upon these forces. For example, when a motorist or bicyclist recognizes a situation that will require him to slow down, he instinctively depends upon frictional forces to contribute to his deceleration. Similarly, when a golfer drives a ball, he depends upon the frictional rolling forces to stop the movement of the golf ball.

The conditions in space are quite different, since there is no air or friction to accomplish these results; and as a result, bodies in space tend to continue their movement, without the advantage of friction to slow them down. As a result, once a body starts to tumble, it tumbles continuously; and once a body attains a movement, it maintains this movement at a constant velocity. Under some conditions, these movements are extremely undesirable, as for example, various movements of an astronaut can cause him to tumble, or to rotate in various directions; and these movements would continue until some force is applied to stop them. In a similar manner, an astronaut leaving his vehicle may impart undesired movements to the vehicle.

Prior-art arrangements for stabilizing and orienting a body in space have been extremely complex, and have used various sensors to detect movement, these sensors producing signals that are applied to various devices that apply opposed or minimizing forces to stop the movements. As a result, these prior-art stabilizing and orienting systems have required complex electronics, have required relatively large power sources, and have become relatively heavy and of doubtful reliability.

OBJECTS AND DRAWINGS

It is therefore an object of the present invention to provide an improved stabilizing and orienting system.

It is another object of the invention to provide a simple reliable nonelectronic stabilizing and orienting system.

It is a further object of the invention to provide an astronaut stabilizing and orienting system that uses gyroscopes and pneumatic fluids.

The attainment of these objects and others will be realized from the teachings of the following specification, taken in conjunction with the drawings of which:

FIGURE 1 is a schematic view of one embodiment of the invention;

FIGURE 2, comprising illustrations 2A, 2B, 2C, and 2D, is a symbolic representation of various phases in the operation of the present invention; and FIGURE 3 shows an arrangement for controlling the angular relation of two gyroscopes.

INTRODUCTION

It is well known that a gyroscope comprises a relatively heavy rotor that spins about its so-called "spin" axis. The gyroscope also has so-called "input" and "output" axes; and when a torque is applied to a gyroscope, it tends to "precess," which means that it tends to turn about one of its axes other than the one it was torqued about. This unusual characteristic, and other information about gyroscopes is explained in a number of publications such as "Basics of Gyroscopes" by Carl Machover. It is also known that a single rotating gyroscope produces a torque that tends to pivot the body to which it is attached; and that this tendency for pivoting can be controlled by using twin gyroscopes that are coupled together, and are spinning in opposite directions.

Attempts have been made to use coupled oppositely-spinning gyroscopes to stabilize and orient space vehicles; but—as indicated above—these prior-art arrangements have invariably used sensors, pilot gyroscopes, and complex electronic circuits. Attention is directed for example to U.S. Patent 3,158,340, D. F. Sellers; and to 2,158,180, R. H. Goddard.

DESCRIPTION OF INVENTION

FIGURE 1 shows on embodiment of the present invention. Here a gyroscopic device comprises two gyroscopic assemblies 10 and 12 containing rotors that are spinning in mutual opposite directions relative to the other, as indicated by the curved arrows 13; and, since the rotors are preferably of substantially identical structure and are spinning at the same rate, the gyroscopes have substantially equal but opposite angular momentums. Various rotor-spinning arrangements are well known, including electrical drives and spring drives. For short duration operations, the rotors may be set spinning at the beginning of operation, and allowed to run down after completion of operation.

Gyroscopes 10 and 12 are shown coupled together by spur gears 14 and 16, but alternative couplings such as belts, chains, or the like may be used. As shown in FIGURE 1, gyroscopes 10 and 12 are mounted on suitable shafts 11 and 15; and shafts 11, 15 may be journalled to a base 19 that is suitably shaped and arranged to be carried by or strapped to an astronaut. Thus, the gyroscopic device has an axis of stabilization 21, which is also the input axis; a precession axis 23, which is also the output axis; and each individual gyroscope has its own spin axis 25, 29. The significance of these terms will become apparent from the following discussion.

The result of the arrangement shown in FIGURE 1 is that as the astronaut tends to pivot about the input axis or axis of stabilization 21, the oppositely-spinning gyroscopes tend to precess in opposite directions about their output axes 11, 15 (or the precession axis 23); that is, they change their angular relationship in a mutually opposite manner—increasing their angular displacement by spreading apart, or decreasing their angular displacement by approaching each other, as indicated by curved double-ended arrow 17. Because of the coupling arrangement 14–16, counter-spinning gyroscopes 10 and 12 precess equally in exactly the same manner and to the same extent—but in opposite directions.

In FIGURE 1, a valving arrangement 18—whose operation will be explained later—comprises a gas inlet line 20, and first and second gas outlets lines 22 and 24; the valving arrangement 18 being such that when an actuator or trigger 26 is depressed, gas from a source 27 flows through inlet line 20, and exits from outlet line 22; and when the other actuator or trigger 28 is depressed, the gas exits from the second outlet line 24. As will be explained later, each gas outlet line 22 and 24 is connected to paired nozzles, or reaction jets, each pair being oriented to pivot the astronaut in an opposite direction about the axis of stabilization.

A digression is necessary at this point to explain the concepts of a "closed" loop and an "open" loop. In a closed loop, a sensor detects a particular condition, and produces an activating signal that activates a device that tends to correct the condition. As corrections are achieved, the sensor produces more-or-less continuous activating signals that control the correcting device. Thus, the sensor activates the device, whose effect is detected by the sensor, which in turn again activates the device. A closed loop can be quite effective, but has three distinct disadvantages; (1) it requires power, (2) it must be carefully designed to provide a fast response and still avoid oscillations, and (3) it tends to be complex.

In an open loop, a sensor merely produces a signal; or else a correcting device becomes operative without getting additional signals from a sensor. This arrangement has the advantage of simplicity, and the disadvantage that it has inherent limitations as to amount of correction (or excess correction) that it may provide.

The operation of the present invention will be understood from FIGURE 2, which is an end-on view of the apparatus of FIGURE 1. In FIGURE 2A, the astronaut is assumed to be stabilized; gyroscopes 10 and 12 are spinning in opposite directions as previously explained, and are illustrated as being "erect." Moreover, since the astronaut is assumed to be not rotating, the gyroscopes are not precessing—that is, are not moving toward or away from each other. As explained in the above-cited book, the operation of a gyroscope may be represented by the use of a so-called "spin vector," a vector being represented by an arrow having a given orientation and length; and in FIGURE 2A spin vectors 30 and 32 are shown for the rotor spin-velocities of the gyroscopes 10 and 12 respectively. It will be seen that spin vectors 30 and 32 point in opposite directions, and have equal lengths; therefore the effect of one gyroscope effectively nullifies the effect of the other—and the oppositely-spinning gyroscopes have essentially no effect on the vehicle, even though frictional torques exist in the rotor spin bearings or in the precession axis bearings.

Assume now that the astronaut is disturbed by some external force, and the resultant torque tends to pivot the gyroscopic device in a given direction around input-stabilization axis 21. In accordance with the principle of precession, this torque causes each gyroscope to precess in an opposite direction, shown in FIGURE 2B as an increased angular displacement. Stated in another way, the torque tending to pivot the astronaut is absorbed in angularly displacing the two gyroscopes, their spin vectors 30 and 32 now forming a slight angle.

Thus, any torque that would cause the astronaut to undergo pivotal motion or change of orientation is absorbed by precession of the gyroscopes, thus stabilizing the astronaut with very little displacement from his original position. As long as the astronaut-pivoting-force is present, the gyroscopes continue to precess, thus absorbing the torque, and stabilizing the astronaut. As soon as the disturbance ceases, so that the astronaut no longer tends to pivot, the gyroscopes no longer precess, and remain in the new angled position that they happen to have at the instant that the astronaut-pivoting-force is removed. Therefore, in FIGURE 2B, the astronaut has been stabilized, the disturbing torque having been absorbed in precession of the gyroscopes; and the resultant angular displacement is an indication of the amount of torque that the separating gyroscopes have absorbed.

It will be recognized that the above stabilizing operation is of the open-loop type. It is simple and reliable, does not require any external power, and acts as its own sensor.

If, however, the astronaut-pivoting-force continues, the gyroscopes continue to precess; and eventually they would reach an angular displacement where they could no longer absorb the torque that is causing the astronaut to pivot. This condition is called "saturation," since the gyroscopes cannot absorb any more energy by precessing. Before this point is reached, however, the condition of FIGURE 2C is obtained.

In FIGURE 2C, the situation is illustrated where the external force has been applied to the astronaut—either for such a long time or to such an extent—so that the separating gyroscopes 10 and 12 are approaching the point where they would no longer be able to absorb energy by precessing. At this time the gyroscopes have moved through their limited amount of freedom of precession (about 45°), and one of the gyroscopes—say gyroscope 10—reaches a predetermined angular position where it triggers valving arrangement 18 by depressing actuator trigger 26. As previously explained, valving arrangement 18 has triggers that, when depressed, permit gas to flow through an outlet line such as 22 or 24 to paired reaction jets such as 36A, 36B and 38A, 38B. In FIGURE 2C the gyroscopes 10 and 12 have separated to such an extent that gyroscope 10 has mechanically depressed trigger 26 of valving arrangement 18; and as a result, gas flows through inlet line 20, through outlet line 22, to paired jets 36A and 36B; where the exiting gas produces a torque about the axis of stabilization 21 in such direction that it opposes the torque that has been tending to cause rotation of the astronaut. The resultant torque from jets 36A and 36B pivots the gyroscopic device, and is illustrated by arrow 40; and this effect counteracts the disturbing torque on the astronaut, and eventually causes him to pivot, or tend to pivot in the opposite direction. As the astronaut is torqued by the jets in the opposite direction, gyroscopes 10 and 12 now approach each other; and as soon as gyroscope 10 has pivoted far enough to release trigger 26 of valving arrangement 18, the flow of gas through line 22 and nozzles 36A and 36B is stopped. At this point, the situation is the same as illustrated in FIGURE 2B; and now the gyroscopes are free to approach each other, or to separate from each other, depending upon the instantaneous disturbing torque experienced by the astronaut.

It will be recognized that the operation described in connection with FIGURE 2C is of the closed-loop type; the angular displacement of the gyroscopes and the valving arrangement acting as a sensor that activates a pair of reaction jets. The jets act as the correction device, and when the correction is large enough, the released valving arrangement deactivates the jets.

It will also be recognized that the above-described operation also "desaturates" the gyroscopic device, in that the operation of the jets removes the saturated gyroscopes from the predetermined angular position, and tends to erect them, i.e., return them to their minimum-displacement angular orientation.

Thus, the arrangement acts as an open-loop system for minor disturbances, and acts as a closed-loop system for major disturbances; providing a substantial range of freedom for the open-loop operation before switching to the closed-loop mode.

It may thus be seen that minor disturbing inputs experienced about the stabilizing axis are counteracted by the separation or approach of the gyroscopes, and major disturbances—such as tumbling—are prevented or corrected by the reaction jets. Thus, the gyroscopic device and the torque-generating jets form a stabilizing system wherein each operates for a given range of disturbing inputs.

If the external torque had happened to be in the other direction, the condition illustrated in FIGURE 2D would have resulted. In this case, gyroscopes 10 and 12 have approached each other, rather than separating; and eventually, at saturation, gyroscope 10 has reached a predetermined angular position, and has depressed the second trigger 28 of valving arrangement 18. When this occurs, gas flows through outlet line 24 and paired reaction jets 38A and 38B; thus causing the astronaut to pivot in the direction opposite that described previously, and to desaturate the gyroscopes. Arrow 42 indicates the torque resulting from the operation of nozzles 38A and 38B.

Valving arrangement 18 may take any suitable form; the simplest, and most preferable from the standpoint of reliability, being a valve that merely permits the gas to flow from an inlet line 20 to one of the outlet lines 22 or 24. Alternatively, the triggers may be mechanically actuated electrical switching arrangements that open valves that permit the gas to flow through the reaction jets.

The above-described operation of the invention is such that it stabilizes an astronaut against disturbances that would cause him to pivot about one axis; three such mutually orthogonal arrangements being required to maintain three-axis stability.

The above-described operation of the invention has been described as stabilizing an astronaut, but it may also be used to orient him. This is achieved as follows: By a suitable mechanism, the astronaut forces the gyroscopes 10 and 12 to precess; their resultant angular displacement thus causing him to pivot in the desired direction.

One form of suitable mechanism for causing the gyroscopes to separate or approach each other is shown in FIGURE 1. This may comprise a handle 44 connected to a push-rod 46, that is in turn connected to a bell-crank 48 that moves a second push-rod 50. The second push-rod 50 is pivotally attached to a slotted disc 52 that is pivotally mounted on one of the spur gears, such as 14; spur-gear 14 having a fixedly positioned pin 54 that is positioned within the slot of disc 52.

In operation, the astronaut provides an input command by pulling on handle 44, the linkage causing disc 52 to rotate until the end of the slot abuts a pin 54, that is affixed to spur-gear 14. The abutting motion causes spur-gear 14 (and coupled spur-gear 16) to rotate part way; the maximum being about 45°. Since spur-gears 14 and 16 are affixed to gyroscopes 10 and 12 respectively, the gyroscopes are forced to pivot away from each other, i.e., they are separated; this separation causing the astronaut to rotate. If, by chance, the gyroscope happened to be at the location where additional separation would trigger the valving arrangement 18, the forced separation due to the input command would then trigger the valving arrangement, and would actuate the reaction jets. Under this condition, body pivoting would result from reaction jet action, rather than from gyro-separation.

Thus, the disclosed invention provides both stabilization and orientation, and does not require any electronic or mechanical servo-loop arrangements.

When the astronaut releases the handle, a suitable centering device 56, such as a spring, centers slotted-disc 52 without rotating the gyroscopes; and of course the operation would work in the opposite direction if the astronaut should push, rather than pull, handle 44.

FIGURE 3 shows another mechanism for causing the gyroscopes to separate or approach each other, the mechanism of FIGURE 3 being incorporated in a composite structure that contains both gyroscope assemblies 10 and 12. In FIGURE 3 an eccentric cam 60 is attached to a shaft 61 that corresponds to shaft 11 or 15 of FIGURE 1, so that a gyroscope rotates with shaft 61. A displacement member 62 is pivoted about a shaft 64, so that displacement member 62 will move as indicated by the arrows 66 and 68 when acted upon by a suitable push-rod or cable attached at end 69. Displacement member 62 has a circular hole containing an annular bearing 70 that encircles cam 60.

In operation, the astronaut provides an input command, as by pulling the handle as previously indicated; and a suitable linkage causing displacement member to pivot as shown by the arrows. Assume that the movement of member 62 is such that the encircling end of member 62 moves upward. As a result, the lower surface of bearing 70 moves upwards and into contact with cam 60, and pushes it upward, so that the cam rotates shaft 61. This resultant rotation of shaft 61 is the equivalent of that produced by the linkage of FIGURE 1; and causes the coupled gyroscopes to either approach each other or separate, depending upon the coupling arrangement and the movement of the displacement member 62. A suitable centering arrangement restores member 62 when the handle is released.

It is desirable to "damp" the gyroscopes, to prevent undesirable oscillations; and damping can be introduced at any convenient location, such as the shaft 11 of gyroscope 10 of FIGURE 1. A damping device 58 may comprise a disc attached to shaft 11, the disc being an eddy-current disc in an electric field, a hysteresis disc in a magnetic field, a configurated disc in a viscous fluid, or the like. A large variety of damping devices are available; and a damping device of this type does not introduce static friction that affects the operation of the system, but rather operates merely to minimize oscillations.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. A dual-mode stabilization system comprising first stabilizing means and second stabilizing means operable through respective first and second ranges of disturbing inputs,
    said first means, comprising gyroscopic means mounted with an appreciable but limited amount of freedom of precession, to effect open-loop angular-momentum-exchange stabilization about an input axis through said first range of input disturbances, that are to be counteracted by said first stabilizing means, a first mode of stabilization being established by said gyroscopic means,
    said second stabilizing means comprising torque-generating means for effecting stabilization about said input axis through said second range of input disturbances that are to be counteracted by said second stabilizing means, a second mode of stabilization being established by said torque-generating means, and
    means, responsive to precession of said gyroscopic means beyond said appreciable but limited precession thereof, for actuating said torque-generating means for causing said stabilization system to operate in a gyroscopic-mode for a first range of disturbances, and to act in a torquer-mode for a second range of disturbances.

2. The combination of claim 1 wherein said torque-generating means comprises normally-inactive force-producing apparatus, and said means for actuating the torque-generating means comprises an actuator—operated by said gyroscopic means upon precession thereof—to activate said force-producing means.

3. A dual-range stabilization system comprising first angular-momentum-absorbing gyroscopic means for achieving primary stabilization about an axis of stabilization by momentum-exchange by said gyroscopic means, said gyroscopic means precessing freely within a predetermined limited range of precession in response to orientation disturbances within a first range of disturbance-magnitudes;

second torque-generating means for achieving secondary stabilization about said axis of stabilization, by generating a torque having a magnitude sufficient to counteract orientation disturbances of a second range of disturbance-magnitudes; and means, responsive to precession of the gyroscopic means beyond said limited range of precession, for actuating the second torque-generating means for producing primary stabilization for first-range disturbances and for producing secondary stabilization for second-range disturbances.

4. The combination of claim 2 including:

a handle;

linkage means, connecting said handle and said gyroscopic device, for causing small movement of said handle to change the angular relationship of said gyroscopes within said predetermined limited range of precession, and causing large movement of said handle to cause said gyroscopes to exceed said predetermined limited range of precession, and to cause said actuating means to actuate said second torque-generating means.

5. A portable extravehicular attitude control device comprising:

a base;

a pair of gyroscopes mounted on said base for stabilization about a common axis, said gyroscopes being mechanically interconnected for mutually opposite pivotal motion about their output axes in response to disturbing torque applied about the axis of stabilization, each said gyroscope having a rotor and means for driving the rotors of the gyroscopes in mutually opposite spin directions with substantially equal but opposite angular momentum;

means for causing said gyroscopes to exert open loop control, including means providing each said gyroscope with a substantial range of freedom of pivotal motion about its output axis to provide such open loop control by angular displacement of the gyroscopes about their output axes through said range of freedom of axis pivotal motion in response to disturbing torques experienced about the axis of stabilization;

a pair of reaction jets connected to react upon the gyroscopes to provide torque about said axis of stabilization;

means for causing the gyroscopes to exert closed loop control and simultaneously restore the gyroscopes toward a position of minimum output axis displacement in response to relatively large magnitude stabilization axis torques and relatively large output axis displacement, comprising (a) jet torquing means for exerting output axis torque on the gyroscopes about said output axis, (b) first and second switching devices each connected to control generation of torque by said jet torquing means in one direction about the output axis, each said switching device having a mechanical actuator positioned to be operated by one of the gyroscopes upon displacement of the gyroscope about its output axis beyond range of freedom of pivotal motion.

6. A portable attitude control device comprising:

a base;

a pair of gyroscopes mounted on the base for stabilization about a common axis, each said gyroscope having a rotor and means for causing the rotors of the gyroscopes to spin in mutually opposite directions with substantially equal but opposite angular momentum;

means for mechanically interconnecting said gyroscopes for mutually opposite angular displacement about their output axes in response to disturbing torque applied about the axis of stabilization;

means for providing each said gyroscope with a substantial range of freedom of angular displacement about its output axis to provide open loop control by angular displacement of the gyroscopes about their outut axes in response to input torque applied about the axis of stabilization;

means for restoring the gyroscopes toward a position of minimum output axis displacement in response to relatively large magnitude stabilization axis torques, comprising torquing jet means for exerting torque on the gyroscopes about said axis of stabilization, and first and second switching devices each connected to control generation of a torque by said reaction jet means in one direction about the output axis, each said switching device having a mechanical actuator positioned to be operated by one of the gyroscopes upon displacement of the gyroscope about its output axis beyond a predetermined angular position; and input command means comprising a manually operated device on the base for exerting mutually opposite torques on the gyroscopes about their output axes.

7. The combination of claim 6 wherein said interconnecting means comprises gears connecting the gyroscopes for oppositely directed angular displacement in unison about their output axes, and said input command means comprises a manually operated device located on the base for positioning one of the gears.

8. A stabilization-orientation system comprising:

a gyroscopic device having coupled counter-spinning gyroscopes, whereby an incipient rotation of the gyroscope mounting arrangement causes the gyroscopes to precess equally;

means for exerting a torque on said gyroscopic device;

a valving arrangement for controlling the torque exerting means; and means for causing said gyroscopic device to activate said valving arrangement when said gyroscopes have precessed a given amount.

9. A stabilization-orientation system comprising:

a gyroscopic device having a pair of coupled counter-spinning gyroscopes, whereby an incipient rotation of the gyroscope mounting arrangement causes the gyroscopes to precess equally;

a torquer for the device including a valving arrangement having a first trigger and a second trigger; and means for causing said gyroscopic device to actuate one of said triggers when said gyroscopes have processed a given amount.

10. A stabilization-orientation system comprising:

a gyroscopic device having a pair of coupled counter-spinning gyroscopes, whereby an incipient rotation of the gyroscope mounting arrangement causes the gyroscopes to precess equally;

a valving arrangement having a first trigger and a second trigger;

means for causing said gyroscopic device to trigger said first trigger when said gyroscopes have precessed a given amount in a first direction; and means for causing said gyroscopic device to trigger said second trigger when said gyroscopes have precessed a given amount in the opposite direction.

11. A stabilization-orientation system comprising:

a gyroscopic device having a pair of coupled counter-spinning gyroscopes, whereby an incipient rotation of the gyroscope mounting arrangement causes the gyroscopes to precess equally;

a valving arrangement having a first trigger associated with a first outlet, and a second trigger associated with a second outlet;

means for causing said gyroscopic device to activate one of said triggers and its associated outlet when said gyroscopes have precessed a given amount; and
reaction jets connected with said outlets to torque the gyroscopic device.

12. A stabilization-orientation system comprising:
a gyroscopic device having a pair of coupled counter-spinning gyroscopes, whereby an incipient rotation of the gyroscope mounting arrangement causes the gyroscopes to precess equally;
a valving arrangement having an inlet line, a first outlet line, a first nozzle, a first trigger associated with said first outlet line and with said first nozzle, a second outlet line, a second nozzle, and a second trigger associated with said second outlet line and with said second nozzle; and
means for causing said gyroscopic device to trigger said valving arrangement to connect said inlet line with said first outlet line when said gyroscopes have precessed a given amount in a first direction, and to trigger said valving arrangement to connect said inlet line with said second output line when said gyroscopes have precessed a given amount in the second direction.

13. A stabilization-orientation system comprising:
a gyroscopic device having a pair of coupled counter-spinning gyroscopes, whereby an incipient rotation of the gyroscope mounting arrangement causes the gyroscopes to precess equally;
a valving arrangement having an inlet line, a first trigger associated with a first outlet line associated with a first pair of nozzles aimed to provide rotation in a first direction, and a second trigger associated with a second outlet line associated with a second pair of nozzles aimed to provide rotation in a second direction; and
means for causing said gyroscopic device to trigger said valving arrangement to connect said inlet line with said first pair of nozzles when said gyroscopes have precessed a given amount in a first direction, and to trigger said valving arrangement to connect said inlet line with said second pair of nozzles when said gyroscopes have precessed a given amount in a second direction.

14. A stabilization-orientation system comprising:
a gyroscopic device having a pair of coupled counter-spinning gyroscopes, whereby an incipient rotation of the gyroscopes mounting arrangement causes the gyroscopes to precess equally;
a source of gas;
a valving arrangement having an inlet line connected to said gas source, a first trigger associated with a first outlet line associated with a first pair of nozzles aimed to produce pivotal motion in a first direction, and a second trigger associated with a second outlet line associated with a second pair of nozzles aimed to produce pivotal motion in the opposite direction; and
means for causing said gyroscopic device to trigger said valving arrangement to connect said gas source with said first pair of nozzles when said gyroscopes have precessed a given amount in a first direction, and to trigger said valving arrangement to connect said gas source with said second pair of nozzles when said gyroscopes have precessed a given amount in a second direction.

15. A stabilization-orientation system comprising:
a gyroscopic device having a pair of coupled counter-spinning gyroscopes, whereby an incipient rotation of the gyroscope mounting arrangement causes the gyroscopes to precess equally;
a source of gas;
a valving arrangement having an inlet line connected to said gas source, a first trigger associated with a first outlet line associated with a first pair of nozzles aimed to produce pivotal motion in a first direction, and a second trigger associated with a second outlet line associated with a second pair of nozzles aimed to produce pivotal motion in the opposite direction;
means for causing said gyroscopic device to trigger said valving arrangement to connect said gas source with said first pair of nozzles when said gyroscopes have precessed a given amount in a first direction, and to trigger said valving arrangement to connect said gas source with said second pair of nozzles when said gyroscopes have precessed a given amount in a second direction;
coupling means for causing said gyroscopes to precess equally in opposite directions—whereby said gyroscopes may vary their angular relationship by separating or approaching each other;
a handle; and
linkage means, connecting said handle and said gyroscopic device, for causing said gyroscopes to change their angular relationship upon movement of said handle.

References Cited
UNITED STATES PATENTS

| | | | |
|---|---|---|---|
| 1,999,897 | 4/1935 | Fieux | 74—5.37 X |
| 3,165,282 | 1/1965 | Noyes | 244—79 |
| 3,193,216 | 7/1965 | Fischell | 74—5.34 X |
| 3,238,793 | 3/1966 | Riordan | 74—5.34 |
| 3,238,957 | 3/1966 | Clarkson | 137—38 |
| 3,265,335 | 8/1966 | McPherson | 244—79 |

CLARENCE R. GORDON, Primary Examiner

U.S. Cl. X.R.

74—5.34, 5.37; 244—3.2, 79